(12) United States Patent
Li et al.

(10) Patent No.: US 9,017,916 B1
(45) Date of Patent: Apr. 28, 2015

(54) PREPARING RESIN EMULSIONS

(71) Applicant: Xerox Corporation, Norwalk, CT (US)

(72) Inventors: Shigeng Li, Webster, NY (US); Eugene F Young, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/104,968

(22) Filed: Dec. 12, 2013

(51) Int. Cl.
*G03G 9/08* (2006.01)
*C09J 191/00* (2006.01)
*C08L 67/00* (2006.01)

(52) U.S. Cl.
CPC ..................... *C08L 67/00* (2013.01)

(58) Field of Classification Search
USPC ................ 430/137, 109, 111, 108.1, 137.14, 430/137.13, 110.2; 524/315, 557, 379, 366
See application file for complete search history.

(56) References Cited

U.S. PATENT DOCUMENTS

| | | | | |
|---|---|---|---|---|
| 5,611,890 | A | * | 3/1997 | Vinson et al. .................. 162/111 |
| 7,790,830 | B2 | * | 9/2010 | Edmiston ........................ 528/34 |
| 2004/0082668 | A1 | * | 4/2004 | Vinson ............................ 516/38 |

FOREIGN PATENT DOCUMENTS

WO    WO 2011/085235 A1 *   7/2011   ............... B01J 20/28

* cited by examiner

*Primary Examiner* — Robert D. Harlan
(74) *Attorney, Agent, or Firm* — MDIP LLC

(57) ABSTRACT

A process for making a latex emulsion including contacting a resin dissolved in a solvent with an absorbent glass that binds the solvent to produce a latex emulsion.

20 Claims, No Drawings

PREPARING RESIN EMULSIONS

FIELD

The present disclosure relates to processes for producing resin emulsions useful for producing toner where organic solvent(s) are removed from the emulsion using glass particles.

BACKGROUND

Latex emulsions of resins can be produced using phase inversion emulsification. Organic solvents generally are removed from the latex emulsion by vacuum distillation. The distillation process can be lengthy.

It would be advantageous to provide an improved process for the preparation of latex resins that reduces the current distillation cycle time and processing cost.

SUMMARY

A phase inversion emulsification (PIE) process for making a latex emulsion suitable for use in a toner comprising use of an organosilica glass particulates for removing organic solvent from latex emulsions is described.

In embodiments, a method for making a latex emulsion is disclosed wherein a swellable organosilica glass material absorbs organic solvent, including a volatile organic compound, surprisingly without adversely influencing resin particle size and toner performance.

In embodiments, a method for making a latex emulsion is disclosed wherein the organosilica material treatment step can occur after a brief pre-distillation step to remove a portion of any volatile organic solvent, following phase inversion to yield a latex emulsion.

Hence, in embodiments, a process of interest may take the form of a method for preparing a latex emulsion from a resin comprising:
 a) combining a resin with a solvent to form a mixture;
 b) optionally neutralizing the mixture with a base;
 c) combining the mixture with water to create a homogenous water in oil dispersion of said resin;
 d) adding water to invert said dispersion into an oil in water dispersion;
 e) distilling the solvent from said oil in water dispersion to yield a residuum;
 f) adding to said residuum an absorbent glass that binds said solvent; and
 g) removing said absorbent glass after an incubation to form said latex emulsion.

DETAILED DESCRIPTION

Latex emulsions of resins commonly are produced using PIE in which resins first are dissolved in an organic solvent, which may be a mixture of solvents, such as, methyl ethyl ketone (MEK) and isopropyl alcohol (IPA), then optionally neutralized with an appropriate base, and then water is introduced into the mixture to create a homogeneous water-in-oil (W/O) dispersion (water droplets dispersed in continuous oil). Subsequently, additional water is added to invert the dispersion into an oil-in-water (O/W) latex emulsion. Energy intensive processing of the latex, such as distillation, is used to remove organic solvents and finally, surfactant and other preservatives may be added to provide a stable latex, for example, with high solid content. The latex can be used for many purposes including emulsion aggregation (EA) methods for the production of toner particles.

The distillation cycle time is time consuming. Dissolution of resin in solvents and conversion of resin to latex can take approximately 3 hours (phase I of PIE) whereas the removal of solvents in latex can require about 8-12 hours (phase II of PIE, solvent stripping process). Distillation temperatures and rate have to be monitored because with certain solvents, foaming can occur, disrupting the process. Hence, for example, when foaming is an issue, temperatures have to reduced, vacuum must be reduced or both to ensure proper removal of solvents without damage to the product and to the devices. The result is a prolonged distillation cycle. There is a need in the industry to improve the current solvent stripping process by finding faster solvent removal alternatives to reduce latex manufacturing time and cost.

The present disclosure provides an alternative or adjunct method to remove solvents in PIE latexes with the use of the product, Osorb®, which is a glass absorbent/adsorbent that surprisingly does not have a negative impact on resulting toner performance.

Osorb®, a product of ABS Materials, Inc., is a flexibly constructed, active organosilicate particle which can capture organic solvents but exclude water, see U.S. Pat. Nos. 7,790,830; 8,217,131; and 8,367,793. The product surprisingly does not have any detrimental effect on eventual toner performance. Osorb® captures a wide range of dissolved and dispersed organics from water, including volatile organic compounds (VOCs), hydrocarbons, pharmaceuticals, pesticides, chlorinated solvents, endocrine disruptors and other contaminants. Captured compounds can be removed with mild thermal treatment or simple rinsing of the glass. Any captured organics then can be disposed, recycled or further refined, generating sustainable resources from PIE latex production. Osorb® can be regenerated. Osorb® is available in two particle sizes, 250-500 μm standard granular material and smaller particles, 177-250 μm. The material swells to about 14 times greater than the original particle size, making the larger-sized glass feasible to be filtered from latex emulsions which have particle size ranging up to about 230 nm.

Generally, the process includes the steps of: (a) adding glass at about 1% w/v to a water/latex sample (1 g of glass if treating 100 mL water/latex), (b) shaking the sample for about 5 min and (c) removing the particulate glass from the water/latex and collecting the residual water/latex, and optionally (d) repeating steps (a)-(c). The glass treatment steps can be repeated as needed until the desired level of an organic in the emulsion is attained, for example less than about 500 ppm.

The amount of glass can be, on a weight to volume basis, from about 0.1% w/v to about 5% w/v, from about 0.5% to about 4% w/v, from about 0.7% to about 3%, from about 0.9% to about 2% w/v of the emulsion, although amounts of glass can be increased to facilitate removal.

The glass treatment can be combined with a distillation step, in any order, and in any combination of number of steps. Thus, a distillation can be followed by one or more glass treatment steps. The distillation step can be about one hour, about two hours, about three hours or more. The subsequent glass treatment step(s) can be a single treatment, two treatments, three treatments, or more. The combination of distillation and glass treatment can be optimized as to time and number of treatments to attain the desired residual amount of an organic solvent in the emulsion in the minimal amount of time, cost or both.

The level of organics remaining in the latex emulsion can be monitored after each treatment step using materials and methods known in the art, such as, a chromatography, such as, gas or liquid chromatography.

The temperature of distillation can be determined based on the boiling point(s) of the solvent(s) present, the glass or melt temperatures of the resin(s), processing considerations, such as, foaming, and so on.

Unless otherwise indicated, all numbers expressing quantities and conditions, and so forth used in the specification and claims are to be understood as being modified in all instances by the term, "about." "About," is meant to indicate a variation of no more than 10% from the stated value. Also used herein is the term, "equivalent," "similar," "essentially," "substantially," "approximating," and, "matching," or grammatic variations thereof, have generally acceptable definitions or at the least, are understood to have the same meaning as, "about."

Resins

Any resin may be utilized in forming a latex emulsion of the present disclosure. The resins may be an amorphous resin, a crystalline resin and/or a combination thereof. The resin may be a polyester resin, including the resins described, for example, in U.S. Pat. Nos. 6,593,049 and 6,756,176, the disclosure of each of which hereby is incorporated by reference in entirety. Suitable resins also may include a mixture of an amorphous polyester resin and a crystalline polyester resin as described in U.S. Pat. No. 6,830,860, the disclosure of which hereby is incorporated by reference in entirety. Suitable resins may include a mixture of high molecular and low molecular weight amorphous polyester resins.

In embodiments, the resin may be a polyester resin formed by reacting a diol with a diacid in the presence of an optional catalyst.

For forming a crystalline or amorphous polyester, suitable diols include aliphatic diols with from about 2 to about 36 carbon atoms selected in an amount of from about 40 to about 60 mole percent, from about 42 to about 55 mole percent, from about 45 to about 53 mole percent, and optionally, a second diol can be selected in an amount of from about 0 to about 10 mole percent, from about 1 to about 4 mole percent of the resin.

Examples of diacids or diesters include vinyl diacids or vinyl diesters selected in an amount of, for example, from about 40 to about 60 mole percent, in embodiments, from about 42 to about 52 mole percent, from about 45 to about 50 mole percent, and optionally, a second diacid may be selected in an amount of from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide) and poly(butylene-succinimide).

The crystalline resin may be present, for example, in an amount of from about 1 to about 50 percent by weight of the toner components, in embodiments, from about 5 to about 35 percent by weight of the toner components. The crystalline resin may possess various melting points of, for example, from about 30° C. to about 120° C., from about 50° C. to about 90° C. The crystalline resin may have a number average molecular weight (Mn), as measured by gel permeation chromatography (GPC) of, for example, from about 1,000 to about 50,000, from about 2,000 to about 25,000, and a weight average molecular weight (Mw) of, for example, from about 2,000 to about 100,000, from about 3,000 to about 80,000, as determined by GPC. The molecular weight distribution (Mw/Mn) of the crystalline resin may be, for example, from about 2 to about 6, from about 3 to about 4.

Polycondensation catalysts may be utilized in forming either the crystalline or amorphous polyesters and include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide or combinations thereof. Such catalysts may be utilized in amounts of, for example, from about 0.01 mole percent to about 5 mole percent based on the starting diacid or diester used to generate the polyester resin.

Examples of unsaturated amorphous resins that can be used include those disclosed in U.S. Pat. No. 6,063,827, the disclosure of which is hereby incorporated by reference in entirety.

The amorphous resin may be present, for example, in an amount of from about 30 to about 100 percent by weight of the toner components, from about 40 to about 95 percent by weight of the toner components. In embodiments, the amorphous resin or combination of amorphous resins utilized in the latex may have a glass transition temperature (Tg) of from about 30° C. to about 80° C., from about 35° C. to about 70° C. In further embodiments, the combined resins utilized in the latex may have a melt viscosity of from about 10 to about 1,000,000 Pa*S at about 130° C., from about 50 to about 100,000 Pa*S at about 130° C.

Other suitable resins that can be used to make toner comprise a styrene, an acrylate, such as, an alkyl acrylate, such as, methyl acrylate, ethyl acrylate, butyl acrylate, isobutyl acrylate, dodecyl acrylate, n-octyl acrylate, n-butylacrylate, 2-chloroethyl acrylate; β-carboxy ethyl acrylate (β-CEA), phenyl acrylate, methacrylate, butadienes, isoprenes, acrylic acids, acrylonitriles, styrene acrylates, styrene butadienes, styrene methacrylates, and so on, such as, methyl α-chloroacrylate, methyl methacrylate, ethyl methacrylate, butyl methacrylate, butadiene, isoprene, methacrylonitrile, acrylonitrile, vinyl ethers, such as, vinyl methyl ether, vinyl isobutyl ether, vinyl ethyl ether and the like; vinyl esters, such as, vinyl acetate, vinyl propionate, vinyl benzoate and vinyl butyrate; vinyl ketones, such as, vinyl methyl ketone, vinyl hexyl ketone, methyl isopropenyl ketone and the like; vinylidene halides, such as, vinylidene chloride, vinylidene chlorofluoride and the like; N-vinyl indole, N-vinyl pyrrolidone, methacrylate, acrylic acid, methacrylic acid, acrylamide, methacrylamide, vinylpyridine, vinylpyrrolidone, vinyl-N-methylpyridinium chloride, vinyl naphthalene, p-chlorostyrene, vinyl chloride, vinyl bromide, vinyl fluoride, ethylene, propylene, butylene, isobutylene and mixtures thereof.

One, two or more resins may be used. Where two or more resins are used, the resins may be in any suitable ratio (e.g., weight ratio), such as, of from about 1% (first resin)/99% (second resin) to about 99% (first resin)/1% (second resin).

A toner may include two amorphous polyester resins and a crystalline polyester resin. The weight ratio of the three resins may be from about 30% first amorphous resin/65% second amorphous resin/5% crystalline resin, to about 60% first amorphous resin/20% second amorphous resin/20% crystalline resin.

A toner may include at least two amorphous polyester resins, a high molecular weight resin and a low molecular weight resin. As used herein, a high molecular weight (HMW) amorphous resin may have a weight average molecular weight (Mw) of from about 35,000 to about 150,000, from about 45,000 to about 140,000, and a low molecular weight (LMW) amorphous resin may have an Mw of from about 10,000 to about 30,000, from about 15,000 to about 25,000.

The weight ratio of the two resins may be from about 10% first amorphous resin/90% second amorphous resin to about 90% first amorphous resin/10% second amorphous resin.

The resin may possess acid groups which, in embodiments, may be present at the terminus of a resin molecule. Acid groups, which may be present, include carboxylic acid groups, and the like. The number of acid groups may be controlled by adjusting the materials utilized to form the resin and reaction conditions.

The resin may have an acid number from about 2 mg KOH/g of resin to about 200 mg KOH/g of resin, from about 5 mg KOH/g of resin to about 50 mg KOH/g of resin, from about 10 mg KOH/g of resin to about 15 mg KOH/g of resin.

Solvent

Any suitable organic solvent may be used to dissolve the resin, for example, alcohols, esters, ethers, ketones, amines and combinations thereof, in an amount of, for example, from about 30% by weight to about 400% by weight of the resin, from about 40% by weight to about 250% by weight of the resin, from about 50% by weight to about 100% by weight of the resin.

Suitable organic solvents, sometimes referred to herein, in embodiments, as phase inversion agents, include, for example, methanol, ethanol, propanol, IPA, butanol, ethyl acetate, MEK and combinations thereof. The organic solvent may be immiscible in water and may have a boiling point of from about 30° C. to about 120° C. When at least two solvents are used, the ratio of solvents can be from about 1:2 to about 1:15, from about 1:2.5 to about 1:12.5, from about 1:3 to about 1:10, from about 1:3.5 to about 1:7.5.

In embodiments, two solvents are used, for example, MEK and IPA, and the resin to solvent (MEK+IPA) ratio may be from about 10:8.5 to about 10:11.5, from about 10:9 to about 10:11. When an LMW resin is included, the ratio of the LMW resin to the first and to the second solvents can be from about 10:6:1.5 to about 10:10:2.5. When an HMW resin is included, the ratio of the HMW resin to the first and to the second solvents can be from about 10:8:2 to about 10:11:3, although amounts outside of the ranges can be used.

Neutralizing Agent

The resin may be mixed with a weak base or buffer. The neutralizing agent may be used to neutralize acid groups in the resin, so a neutralizing agent herein may also be referred to as a, "basic neutralization agent." Any suitable basic neutralization reagent may be used and may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof and the like. Suitable basic agents may also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines and combinations thereof. In embodiments, the monocyclic and polycyclic compounds may be unsubstituted or substituted at any carbon position on the ring.

An emulsion formed includes a quantity of water, de-ionized water (DIW), in amounts of from about 30% to about 95%, from about 30% to about 60%, at temperatures that melt or soften the resin, from about 25° C. to about 120° C., from about 35° C. to about 80° C.

The basic agent may be utilized in an amount of from about 0.001% by weight to 50% by weight of the resin, from about 0.01% by weight to about 25%, from about 0.1% by weight to 5% by weight of the resin. The neutralizing agent may be added in the form of an aqueous solution or as a solid. In embodiments, plural forms of bases are used in a process of interest. Hence, a process can comprise a first base, and at a different or successive step, a second base is used.

Utilizing the above basic neutralization agent in combination with a resin possessing acid groups, a neutralization ratio of from about 25% to about 300% may be achieved, from about 50% to about 200%. The neutralization ratio may be calculated as the molar ratio of basic groups provided with the basic neutralizing agent to the acid groups present in the resin multiplied by 100%.

Addition of the basic neutralization agent may thus raise the pH of an emulsion including a resin possessing acid groups from about 5 to about 12, from about 6 to about 11. The neutralization of the acid groups may, in embodiments, enhance formation of the emulsion.

Surfactants

The process of the present disclosure may optionally include adding a surfactant, before or during the combining, to the resin at an elevated temperature.

Where utilized, a resin emulsion may include one, two or more surfactants. The surfactants may be selected from ionic surfactants and nonionic surfactants. Anionic surfactants and cationic surfactants are encompassed by the term, "ionic surfactants." The surfactant may be added as a solid or as a solution with a concentration of from about 5% to about 100% (pure surfactant) by weight, from about 10% to about 95% by weight. The surfactant may be utilized so that it is present in an amount of from about 0.01% to about 20% by weight of the resin, from about 0.1% to about 16% by weight, from about 1% to about 14% by weight of the resin.

Processing

The present process may include forming a mixture at an elevated temperature containing at least one amorphous resin, one or more organic solvents, optionally a surfactant and optionally a neutralizing agent to form a latex emulsion. Resins may be pre-blended prior to forming the emulsion.

The elevated temperature may be near to or above the Tg of the amorphous resin(s).

Thus, in embodiments, a process of the present disclosure may include contacting at least one resin with an organic solvent to form a resin mixture, optionally heating the resin mixture to an elevated temperature, optionally stirring or shaking the mixture, optionally adding a neutralizing agent to neutralize the acid groups of the resin, adding water to the mixture until phase inversion occurs to form a phase inversed latex emulsion, adding particulate glass to remove the organic reagent(s), which step can be practiced a plurality of times until the desired organic solvent content in the latex is obtained, retaining the aqueous latex emulsion, optionally distilling any solvent from the latex emulsion to remove any organic solvents and collecting the aqueous remainder containing the latex.

For example, in a PIE, an amorphous and/or a combination of at least one amorphous and a crystalline resin is dissolved in a low boiling point organic solvent(s), which solvent is miscible or partially miscible in water, such as, MEK, at a concentration of from about 1% by weight to about 75% by weight resin in solvent, from about 5% by weight to about 60% by weight resin in solvent. The resin mixture is heated to a temperature of from about 25° C. to about 100° C., from about 30° C. to about 90° C., from about 35° C. to about 85° C. The heating need not be held at a constant temperature and may be varied. For example, the heating may be slowly or incrementally increased until a desired temperature is achieved.

Once the resins, optional neutralizing agent and optional surfactant are combined, the mixture is contacted with water to form a latex emulsion. Water may be added to form a latex with a solids content of from about 5% to about 60%, from about 10% to about 50%. While higher water temperatures may accelerate dissolution, latexes may be formed at temperatures as low as room temperature. Water temperatures may be from about 40° C. to about 110° C., from about 50° C. to about 90° C.

Mixing may be conducted, in embodiments, utilizing any means within the purview of those skilled in the art. For example, mixing may be conducted in a glass kettle with an anchor blade impeller, an extruder, i.e., a twin screw extruder, a kneader, such as, a Haake mixer, a batch reactor or any other device capable of intimately mixing viscous materials to create near or homogenous mixtures.

Stirring, although not necessary, may be utilized to enhance formation of the latex. Any suitable stirring device may be utilized. The stirring may be at a speed of from about 10 revolutions per minute (rpm) to about 5,000 rpm, from about 20 rpm to about 2,000 rpm, from about 50 rpm to about 1,000 rpm. The stirring need not be at a constant speed, but may be varied. For example, as the heating of the mixture becomes more uniform, the stirring rate may be increased. In embodiments, a homogenizer (that is, a high shear device), may be utilized to form the phase inversed emulsion, although the process may take place without the use of a homogenizer. Where utilized, a homogenizer may operate at a rate of from about 3,000 rpm to about 10,000 rpm.

Although the point of phase inversion may vary depending on the components of the emulsion, the temperature of heating, the stirring speed, and the like, phase inversion may occur when the optional basic neutralization agent, optional surfactant, and water are added so that the resulting resin is present in an amount from about 5% by weight to about 70% by weight of the emulsion, from about 20% by weight to about 65% by weight, from about 30% by weight to about 60% by weight of the emulsion.

Following phase inversion, additional optional surfactant, water, and optional aqueous alkaline solution are added to dilute the phase inversed emulsion, although not required.

Following phase inversion, particulate glass is added to the emulsion, optionally with heating and/or stirring, to capture organic solvent(s). If heating is employed, the temperature should not exceed the mixing temperature. If mixing or stirring is employed, the rate is one to merely ensure dispersion or exposure of the glass to the fluid. The glass particulate is removed from the emulsion by known methods, such as, filtration, decantation, centrifugation and so on. The solvent removal step can be repeated. The phase inversed substantially aqueous emulsion may be cooled to room temperature (RT), for example from about 20° C. to about 25° C.

The desired properties of the resin (i.e., particle size and low residual solvent level) may be achieved by adjusting the solvent, neutralizer concentration, process parameters (i.e., reactor temperature, vacuum and process time) and so on.

Toner

The resulting latex then may be utilized to form a toner by any method within the purview of those skilled in the art. The latex emulsion may be contacted with an optional colorant, optionally in a dispersion, an optional wax and so on as known in the art to form a toner by a suitable process, such as, an emulsion/aggregation (EA) and coalescence process.

Colorants

As the colorant that can be added, various known suitable colorants, such as dyes, pigments, mixtures of dyes, mixtures of pigments, mixtures of dyes and pigments, and the like, may be included in the toner. In embodiments, the colorant may be included in the toner in an amount of, for example, 0 to about 35% by weight of the toner, from about 3 to about 5% by weight of the toner, although the amount of colorant can be outside of those ranges.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™ or TMB-104™; and the like. As colored pigments, there can be selected cyan, magenta, yellow, red, green, brown, blue or mixtures thereof. Generally, cyan, magenta or yellow pigments or dyes or mixtures thereof, are used. The pigment or pigments are generally used as water-based pigment dispersions.

Wax

Optionally, a wax may also be combined with the resin and a colorant in forming toner particles. The wax may be provided in a wax dispersion, which may include a single type of wax or a mixture of two or more different waxes.

When included, the wax may be present in an amount of, for example, from about 1% by weight to about 25% by weight of the toner particles, from about 5% by weight to about 20% by weight of the toner particles, although the amount of wax can be outside of those ranges.

When a wax dispersion is used, the wax dispersion may include any of the various waxes conventionally used in emulsion aggregation toner compositions. Waxes that may be selected include waxes having, for example, an average molecular weight of from about 500 to about 20,000, in embodiments, from about 1,000 to about 10,000.

Toner Preparation

The toner particles may be prepared by any method within the purview of one skilled in the art. Although embodiments relating to toner particle production are described below with respect to EA processes, any suitable method of preparing toner particles may be used, including, chemical processes, such as, suspension and encapsulation processes disclosed in U.S. Pat. Nos. 5,290,654 and 5,302,486, the disclosure of each of which hereby is incorporated by reference in entirety. In embodiments, toner compositions and toner particles may be prepared by aggregation and coalescence processes in which smaller-sized resin particles are aggregated to the appropriate toner particle size and then coalesced to achieve the final toner particle shape and morphology.

In embodiments, toner compositions may be prepared by EA processes, such as, a process that includes aggregating a mixture of an optional colorant, an optional wax and any other desired or required additives, and emulsions including a resin made as described above, optionally in surfactants as described above, and then coalescing the aggregate mixture. A mixture may be prepared by adding an optional colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. The pH of the mixture may be adjusted to from about 2 to about 5. The mixture may be homogenized.

Following preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent, such as, polyaluminum halides, such as, polyaluminum chloride (PAC), or the corresponding bromide, fluoride or iodide, polyaluminum silicates, such as, polyaluminum sulfosilicate (PASS), and water soluble metal salts, including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate and combinations thereof. In embodiments, the aggregating agent may be added to the mixture at a temperature that is below the Tg of the resin.

The aggregating agent may be added to the mixture utilized to form a toner in an amount of, for example, from about 0.1% to about 10% by weight, from about 0.2% to about 8% by weight, from about 0.3% to about 5% by weight, of the resin in the mixture.

The particles aggregate until a desired particle size is obtained. Particle size can be monitored during the growth process, for example with a COULTER COUNTER, for average particle size. The aggregation may proceed by maintaining the elevated temperature, or slowly raising the temperature to, for example, from about 40° C. to about 100° C., and holding the mixture at that temperature for a time of from about 0.5 hours to about 6 hours while maintaining stirring, to provide the aggregated particles.

Once the desired size of the toner particles is achieved, the pH of the mixture may be adjusted with base or a buffer to a pH of from about 3 to about 10 to freeze, that is, to stop, toner growth. The base utilized may be any suitable base such as, for example, alkali metal hydroxides, such as, for example, sodium hydroxide, potassium hydroxide, ammonium hydroxide, combinations thereof and the like. In embodiments, a chelator, such as, ethylene diamine tetraacetic acid (EDTA), may be added to help adjust the pH to the desired values noted above.

Shell Resin

In embodiments, after aggregation, but prior to coalescence, a resin coating may be applied to the aggregated particles to form a shell thereover. Any resin described above or as known in the art may be utilized as the shell. A polyester amorphous resin latex as described above may be included in the shell, which may be combined with a different resin, and then added to the particles as a resin coating to form a shell.

The shell resin may be applied to the aggregated particles by any method within the purview of those skilled in the art. The resins utilized to form the shell may be in an emulsion, including any surfactant described above. The emulsion possessing the resins, optionally the solvent-based amorphous polyester resin latex neutralized with NaOH described above, may be combined with the aggregated particles described above so that the shell forms over the aggregated particles.

The shell may be present in an amount of from about 10% by weight to about 40% by weight of the latex particles, from about 20% by weight to about 35% by weight of the latex particles.

In embodiments, the final size of the toner particles may be less than about 8 µm, less than about 7 µm, less than about 6 µm in size.

Coalescence

Following aggregation to the desired particle size and application of any optional shell, the particles may then be coalesced to the desired final shape, the coalescence being achieved by, for example, heating the mixture to a temperature of from about 45° C. to about 100° C., from about 55° C. to about 99° C. which may be at or above the Tg of the resins utilized to form the toner particles. Coalescence may be accomplished over a period of from about 0.01 to about 9 hours, from about 0.1 to about 4 hours.

After aggregation and/or coalescence, the mixture may be cooled to room temperature, such as, from about 20° C. to about 25° C. The cooling may be rapid or slow, as desired. A suitable cooling method may include introducing cold water to a jacket around the reactor. After cooling, the toner particles may be optionally washed with water and then dried. Drying may be accomplished by any suitable method for drying, including, for example, freeze-drying.

Additives

The toner particles may contain other optional additives, as desired or required. For example, the toner may include positive or negative charge control agents, for example, in an amount of from about 0.1 to about 10% by weight of the toner, in embodiments, from about 1 to about 3% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in entirety; organic sulfate and sulfonate compositions, including those disclosed in U.S. Pat. No. 4,338,390, the disclosure of which is hereby incorporated by reference in entirety; cetyl pyridinium tetrafluoroborates; distearyl dimethyl ammonium methyl sulfate; aluminum salts, such as, BONTRON E84™ or E88™ (Orient Chemical Industries, Ltd.); combinations thereof and the like.

Flow additives also can be blended with the toner particles. Examples include metal oxides, such as, titanium oxide, silicon oxide, aluminum oxides, cerium oxides, tin oxide, mixtures thereof and the like; colloidal and amorphous silicas, such as, AEROSL®, metal salts and metal salts of fatty acids inclusive of zinc stearate and calcium stearate, or long chain alcohols, such as, UNILIN 700, and mixtures thereof.

In general, silica may be applied to the toner surface for toner flow, tribo enhancement, admix control, improved development and transfer stability and higher toner blocking temperature. $TiO_2$ may be applied for improved relative humidity (RH) stability, tribo control and improved development and transfer stability. Zinc stearate, calcium stearate and/or magnesium stearate may be used for lubricating properties, developer conductivity, tribo enhancement and enabling higher toner charge and charge stability by increasing the number of contacts between toner and carrier particles. The external surface additives may be used with or without a coating.

Each of the external additives may be present in an amount of from about 0.1% by weight to about 5% by weight of the toner, from about 0.25% by weight to about 3% by weight of the toner, although the amount of additives can be outside of those ranges. In embodiments, the toners may include, for example, from about 0.1% by weight to about 5% by weight titania, from about 0.1% by weight to about 8% by weight silica and from about 0.1% by weight to about 4% by weight zinc stearate.

Suitable additives include those disclosed in U.S. Pat. Nos. 3,590,000, 3,800,588 and 6,214,507, the disclosure of each of which hereby is incorporated by reference in entirety.

In embodiments, the dry toner particles having a shell of the present disclosure may, exclusive of external surface additives, have the following characteristics:

(1) volume average diameter (also referred to as "volume average particle diameter") of from about 3 to about 25 μm, from about 4 to about 15 μm, from about 5 to about 12 μm;

(2) number average geometric size distribution (GSDn) and/or volume average geometric size distribution (GSDv) of from about 1.05 to about 1.55, from about 1.1 to about 1.4; and (3) circularity of from about 0.93 to about 1, in embodiments, from about 0.95 to about 0.99 (as measured with, for example, a Sysmex FPIA 2100 analyzer).

The characteristics of toner particles may be determined by any suitable technique and apparatus, such as, a Beckman Coulter MULTISIZER 3.

The toner can be used in an electrophotographic, xerographic or other imaging device as known in the art.

The subject matter now will be exemplified in the following non-limiting examples. Parts and percentages are by weight unless otherwise indicated. As used herein, "room temperature," (RT) refers to a temperature of from about 20° C. to about 30° C.

EXAMPLES

Example 1

Osorb®-Treated Water Containing MEK and IPA

A solution of MEK/IPA was prepared with MEK concentration at 16% (v/v) and IPA concentration at 2% (v/v). After vigorous shaking for 1 min, Osorb® was added and filtered, and the VOC level of the remaining aqueous solution was characterized. The gas chromatography (GC) measurements showed that 14% MEK and 12% IPA were successfully removed from the solution.

Example 2

Osorb®-Treated Latex

About 0.5 g Osorb® were added to 50 mL latex of a high molecular weight amorphous polyester resin which was made with MEK and IPA using PIE. The latex was shaken for 5 min and the Osorb® material was removed by filtration using a sieve with 425 μm pores. The latex was treated an additional three times with Osorb®, and both latex particle size and VOC level were measured using a Nanotrac analyser (Microtrac, FL) and gas chromatography, respectively.

TABLE 1

Particle Size Before and After Osorb® Treatment

| Sample ID | $D_{50}$ (nm) | $D_{95}$ (nm) | Peak Width (nm) |
|---|---|---|---|
| Pre-treat | 199 | 342 | 140 |
| Post-treat | 195 | 280 | 90 |

In Table 1, Pre-treat is the original latex without any absorbent treatment and Post-treat is the filtered latex sample after the fourth Osorb® treatment. Particle size distribution ($D_{95}$ and the width of peak were used to quantify the particle size distribution) improved after Osorb® treatment, which may be due to removal of the MEK and IPA from larger polyester particles.

Table 2 shows the VOC results of latex samples measured by GC and the removal efficiency achieved at each treatment. It was observed that 16.5% MEK and 4.4% IPA were removed by Osorb® from latex without affecting latex particle size.

TABLE 2

| Sample | MEK (ppm) | IPA (ppm) | MEK Removal Efficiency (%) | IPA Removal Efficiency (%) |
|---|---|---|---|---|
| Pre-treat | 85,000 | 33,000 | 0 | 0 |
| $1^{st}$ cycle | 80,500 | 34,000 | 5.3 | |
| $2^{nd}$ cycle | 77,500 | 33,000 | 8.8 | |
| $3^{rd}$ cycle | 74,500 | 33,000 | 12.4 | |
| $4^{th}$ cycle | 71,000 | 32,500 | 16.5 | 4.4 |

Example 3

Osorb®-Treated Latex

The latex prepared as in Example 2 was distilled under vacuum for about two hours to remove a portion of the VOC's. Once cooled, Osorb® was added to the latex at a concentration of 1 g Osorb® per 100 mL latex, mixed for 5 minutes as conducted in the other examples, and filtered to collect treated latex. The latex was treated two more times with Osorb® as practiced in the examples, and the resin was analyzed by Nanotrac and GC.

Starting at a lower overall solvent level due to prior distillation (Table 4), Osorb® treatment improved solvent removal efficiency significantly without influencing particle size (Table 3). About 53.5% MEK was removed and 22.2% IPA was removed. That is more efficient than vacuum distillation alone. IPA can be difficult to strip in PIE latex. The regular vacuum distillation usually takes about 8 hours to reduce MEK and IPA amounts environmentally safe levels, for example, at least below about 500 ppm. Compared to vacuum distillation, Osorb® took only 10 min to remove most of the VOCs in the latex.

TABLE 3

Particle Size Before and After Osorb ® Treatment

| Sample ID | $D_{50}$ (nm) | $D_{95}$ (nm) | Peak Width (nm) |
|---|---|---|---|
| Pre-treat | 190 | 289 | 90 |
| Post-treat | 190 | 282 | 90 |

TABLE 4

VOC in Latex Before and After Osorb ® Treatment.

| Sample | MEK (ppm) | IPA (ppm) | MEK Removal Efficiency (%) | IPA Removal Efficiency (%) |
|---|---|---|---|---|
| Pre-treat | 170 | 1,800 | 0 | 0 |
| $1^{st}$ cycle | 120 | 1,650 | 29.4 | 8.3 |
| $2^{nd}$ cycle | 79 | 1,400 | 53.5 | 22.2 |

Example 4

Comparative Treatment

The latex of Example 2 was distilled under high vacuum as in Example 3 to remove the majority of VOC's. A molecular sieve with 0.3 nm pores (Fisher Scientific) was added to the latex at a similar concentration of 1 g molecular sieve per 100 mL latex. The contents were mixed for five minutes and filtered to collect the treated latex. The latex was treated an additional 2 times, again at five minutes for each treatment, and then the latex was separated and analyzed by Nanotrac and GC techniques.

TABLE 5

VOC in Latex Before and After Molecular Sieve Treatment.

| Sample | MEK (ppm) | IPA (ppm) | MEK Removal Efficiency (%) | IPA Removal Efficiency (%) |
|---|---|---|---|---|
| Pre-treat | 240 | 1,800 | 0 | 0 |
| $1^{st}$ cycle | 220 | 1,600 | 8.3 | 11.1 |
| $2^{nd}$ cycle | 200 | 1,500 | 16.7 | 16.7 |

The molecular sieve did not remove MEK and IPA from the latex product as efficiently as did Osorb® (see Example 4).

In addition, the retrieval of solvent is labor and time consuming, and costly, if at all possible. For example, regeneration of some molecular sieves requires substantial pressure change (as in oxygen concentrators), heating and purging with a carrier gas, or heating under high vacuum. Regeneration temperatures can range from 175° C. to 315° C. On the other hand, Osorb® can be regenerated under much more mild conditions and with greater efficiency.

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in entirety.

We claim:

1. A method for preparing a latex emulsion from a resin comprising:
   a) combining a resin with a solvent to form a mixture;
   b) optionally neutralizing the mixture with a base;
   c) combining the mixture with water to create a homogenous water in oil dispersion of said resin;
   d) adding water to invert said dispersion into an oil in water dispersion;
   e) distilling the solvent from said oil in water dispersion to yield a residuum;
   f) adding to said residuum an absorbent glass that binds said solvent; and
   g) removing said absorbent glass after an incubation to form said latex emulsion.

2. The method of claim 1, wherein said resin comprises a polyester polymer.

3. The method of claim 1, wherein said resin comprises at least two resins.

4. The method of claim 1, wherein said resin comprises an amorphous resin.

5. The method of claim 1, wherein said resin comprises a high molecular weight amorphous polyester resin and a low molecular weight amorphous polyester resin.

6. The method of claim 1, wherein said resin comprises a crystalline resin.

7. The method of claim 1, wherein said resin comprises a crystalline and an amorphous resin.

8. The method of claim 1, wherein said solvent comprises a volatile organic compound.

9. The method of claim 1, wherein said solvent is selected from the group consisting of methanol, ethanol, isopropanol, butanol, ethylene glycol, glycerol, sorbitol, acetone, 2-butanone, 2-pentanone, 3-pentanone, ethyl isopropyl ketone, methyl isobutyl ketone, diisobutyl ketone, methyl ethyl ketone, dimethylformamide, dimethylacetamide, N-methylpyrrolidone, 1,2-dimethyl-2-imidazolidinone, acetonitrile, propionitrile, butyronitrile, isobutyronitrile, valeronitrile, benzonitrile, ditertbutyl ether, dimethoxyethane, 2-methoxyethyl ether, 1,4-dioxane, tetrahydrohyran, morpholine, methylsulfonylmethane, sulfolane, dimethylsulfoxide, hexamethylphosphoramide, a benzene, an ester, an amine and combinations thereof.

10. The method of claim 1 wherein said steps (f) and (g) are repeated.

11. The method of claim 1, wherein steps (f) and (g) are repeated twice.

12. The method of claim 1, comprising at least two solvents.

13. The method of claim 1, wherein said solvent comprises methyl ethyl ketone (MEK) and isopropyl alcohol (IPA).

14. The method of claim 1, wherein said base is selected from the group consisting of ammonium hydroxide, potassium hydroxide, sodium hydroxide, sodium carbonate, sodium bicarbonate, lithium hydroxide, potassium carbonate, potassium bicarbonate, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof.

15. The method of claim 1, wherein said absorbent glass comprises particles.

16. The method of claim 1, wherein said absorbent glass is present in an amount from about 0.1 to about 5% w/v.

17. The method of claim 1, wherein said distilling step comprises about one hour.

18. The method of claim 1, wherein said distilling step comprises about two hours.

19. The method of claim 17, wherein steps (f) and (g) are repeated twice.

20. The method of claim 17, wherein steps (f) and (g) are repeated at least twice.

* * * * *